United States Patent
Saito et al.

(10) Patent No.: US 9,335,856 B2
(45) Date of Patent: May 10, 2016

(54) DISPLAY DEVICE

(71) Applicant: Japan Display Inc., Minato-ku (JP)

(72) Inventors: Keiichi Saito, Tokyo (JP); Hideyuki Takahashi, Tokyo (JP); Takashi Nakamura, Tokyo (JP); Satoru Tomita, Tokyo (JP); Masahiro Tada, Tokyo (JP); Hirotaka Hayashi, Tokyo (JP); Takashi Okada, Tokyo (JP); Yoshiro Aoki, Tokyo (JP); Takanori Tsunashima, Tokyo (JP)

(73) Assignee: Japan Display Inc., Minato-ku (JP)

( * ) Notice: Subject to any disclaimer, the term of this patent is extended or adjusted under 35 U.S.C. 154(b) by 268 days.

(21) Appl. No.: 14/152,143

(22) Filed: Jan. 10, 2014

(65) Prior Publication Data

US 2014/0210777 A1 Jul. 31, 2014

(30) Foreign Application Priority Data

Jan. 28, 2013 (JP) ................................. 2013-013123

(51) Int. Cl.
*G06F 3/045* (2006.01)
*G06F 3/041* (2006.01)
*G06F 3/044* (2006.01)

(52) U.S. Cl.
CPC .............. *G06F 3/0412* (2013.01); *G06F 3/044* (2013.01); *G06F 3/0416* (2013.01)

(58) Field of Classification Search
CPC ...... G06F 3/0412; G06F 3/0416; G06F 3/044
See application file for complete search history.

(56) References Cited

U.S. PATENT DOCUMENTS

2004/0043676 A1 3/2004 Tada et al.
2012/0044176 A1* 2/2012 Nakamura ............ G06F 3/0412
                                                                345/173

FOREIGN PATENT DOCUMENTS

| JP | 2004-93891 | 3/2004 |
|---|---|---|
| JP | 2004-93894 | 3/2004 |
| JP | 2011-141519 | 7/2011 |
| JP | 2011-1807369 | 9/2011 |
| JP | 2011-210039 | 10/2011 |
| JP | 2012-43201 | 3/2012 |
| JP | 2012-108422 | 6/2012 |

OTHER PUBLICATIONS

Japanese Office Action issued Mar. 8, 2016 in Japanese Patent Application No. 2013-013123 with English translation, 3 pages.

* cited by examiner

*Primary Examiner* — Charles Hicks
*Assistant Examiner* — Brent D Castiaux
(74) *Attorney, Agent, or Firm* — Oblon, McClelland, Maier & Neustadt, L.L.P

(57) ABSTRACT

According to one embodiment, a display device includes a display pixel allocated at a matrix state in a display area, an image-reading device which detects strength of capacitive coupling by a dielectric material coming close to or making contact with the display area, and a control portion which controls each transistor of the image-reading device. The image-reading device includes a detection electrode which forms capacitance between the detection electrode and the dielectric material, a pre-charge gate line, a coupling pulse line, a readout gate line, a pre-charge line and a readout line. These lines supply a signal which drives the image-reading device. The image-reading device further includes a pre-charge transistor, an amplification transistor, a readout transistor, a compensation transistor, and a power-source switching transistor.

7 Claims, 6 Drawing Sheets

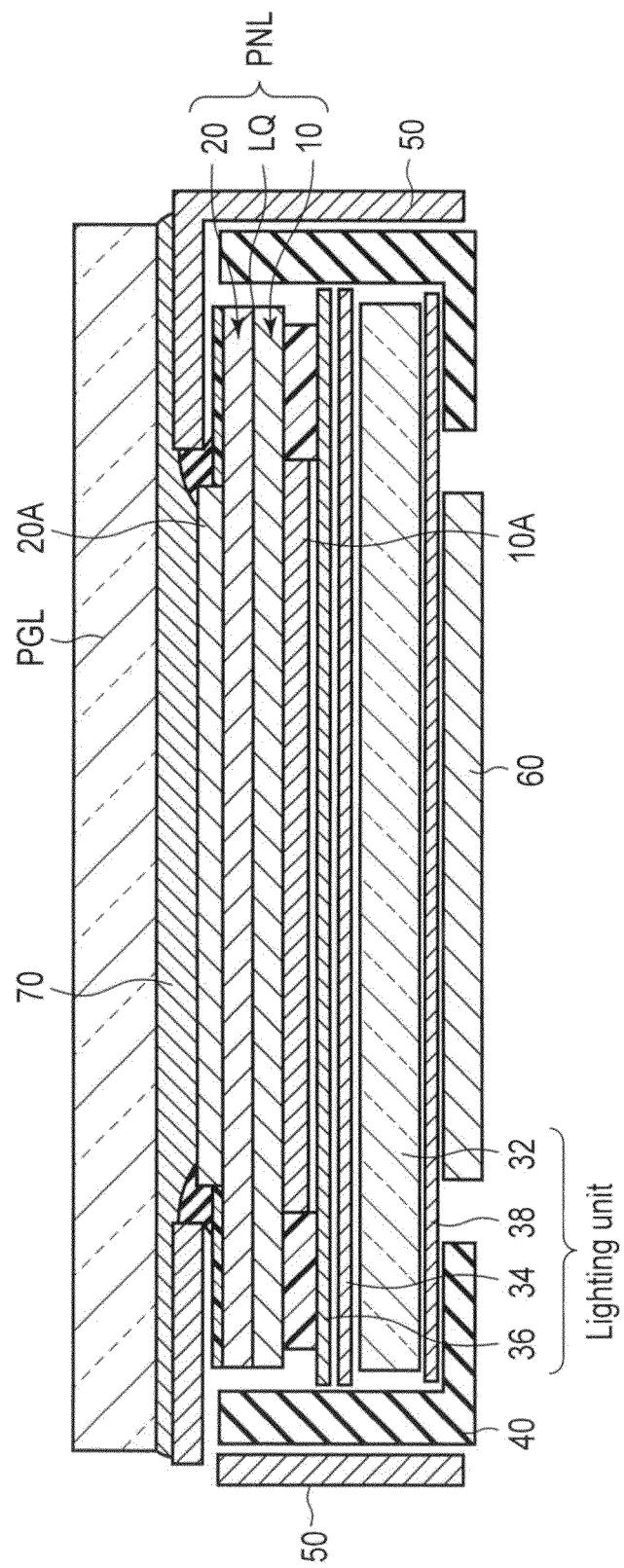
F I G. 2

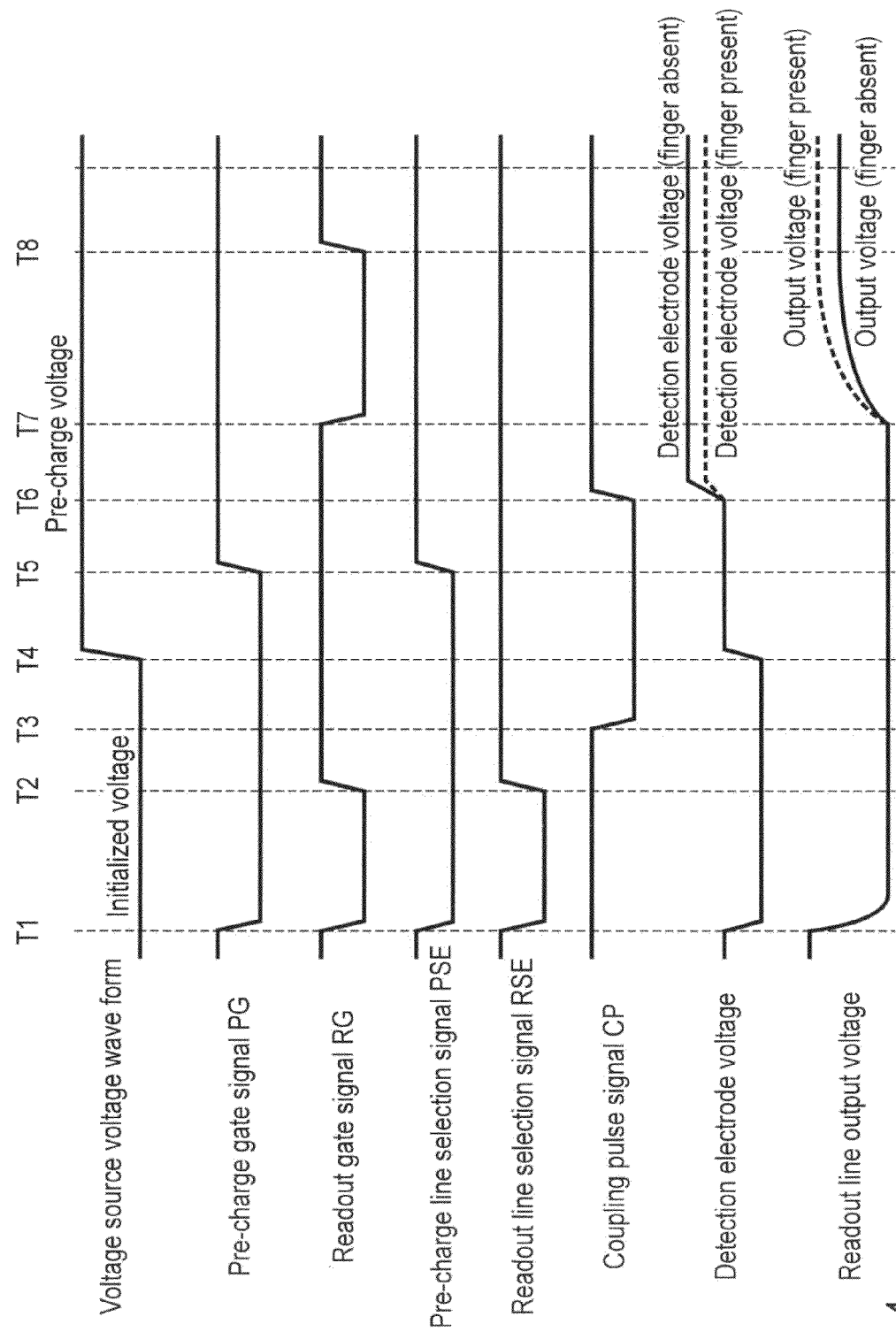
F I G. 4

| Driving method | Operation timing (Frame) | | | | | | | |
|---|---|---|---|---|---|---|---|---|
| Basic driving | Sensor 1st row | Display 1st–16th rows | Sensor 2nd row | Display 17th–32nd rows | ... | Sensor 30th row | Display 465th–480th rows | V-BLK |
| Double driving | Sensor 1st row | Sensor 1st row | Display 1st–16th rows | Sensor 2nd row | Sensor 2nd row | Display 17th–32nd rows | ... | Sensor 30th row | Sensor 30th row | Display 465th–480th rows | V-BLK |

F I G. 6

DISPLAY DEVICE

CROSS-REFERENCE TO RELATED APPLICATIONS

This application is based upon and claims the benefit of priority from Japanese Patent Application No. 2013-013123, filed Jan. 28, 2013, the entire contents of which are incorporated herein by reference.

FIELD

Embodiments described herein relate generally to a display device.

BACKGROUND

As a form of a user interface, electronic devices comprising a display device having a touchscreen function, such as a mobile phone, a mobile information terminal and a personal computer have been developed. For such electronic devices having a touchscreen function, it is being considered to add a touchscreen function by attaching a separate touchscreen substrate to a display device such as a liquid crystal display device and an organic electroluminescent display device.

Currently, research is being conducted into a technique for producing an image-reading device by forming thin films from various materials on a transparent insulating substrate such as a glass substrate by means of chemical vapor deposition (CVD), etc., repeating cutting and grinding operations, etc., and forming a display element made from a scanning line and a signal line and an optical sensor element, etc.

In addition, a technique for detecting a contact position by means of a capacitive system is being investigated as a reading system of an image-reading device. In the capacitive system, a conductive electrode is allocated instead of an optical sensor element, etc. Based on the capacitance change between the electrode and a finger, etc., information of the finger, etc., on the surface of the panel is detected.

With respect to a display device using a capacitive system, people have vigorously developed a technique for incorporating a sensor function into a display panel such as a liquid crystal. This technique is a so-called in-cell technique. According to the in-cell technique, there is no need to attach a touchscreen which is separately manufactured to a liquid crystal, etc. Therefore, it is possible to avoid increase in thickness or weight of the whole electronic device. In addition, since there is no phase boundary between the liquid crystal, etc., and the touchscreen, light reflection which is easily caused at a phase boundary is not generated. Thus, the in-cell technique is excellent in display quality.

When a sensor function is incorporated into a display panel by using the in-cell technique, the display function is placed in proximity to the sensor function. Because of this structure, the detection signal of the sensor may be influenced by the display pattern of the display panel, and the detection accuracy might be decreased.

A plurality of thin-film transistors (TFTs) are used for the sensor circuit as an image-reading device which is incorporated into a display panel by means of the in-cell technique. In general, as the threshold voltages of TFTs differ from each other, it is difficult to produce several hundreds of thousands to several millions of TFTs having the same threshold voltage. As a result, the output signals from the sensor circuit vary from each other. This causes the reduction in detection accuracy.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 2 is an exemplary diagram showing a cross-sectional surface of the display device of the embodiment.

FIG. 4 is an exemplary timing chart for explaining an example of a driving method of the display device of the embodiment.

FIG. 6 is an exemplary diagram for explaining a driving method of a display and a sensor in the display device of the embodiment.

DETAILED DESCRIPTION

Various embodiments will be described hereinafter with reference to the accompanying drawings.

In general, according to one embodiment, a display device includes:

a display pixel allocated at a matrix state in a display area;

an image-reading device which detects strength of capacitive coupling by a dielectric material coming close to or making contact with the display area; and a control portion which controls each transistor of the image-reading device, wherein the image-reading device includes:

a pre-charge gate line, a coupling pulse line and a readout gate line, these lines supplying a signal driving the image-reading device;

a detection electrode which forms capacitance between the detection electrode and the dielectric material;

a pre-charge line which applies a voltage to the detection electrode;

a readout line which reads a detection signal from the detection electrode;

a pre-charge transistor in which one of a source electrode and a drain electrode is electrically connected to the pre-charge line, and a gate electrode is electrically connected to the pre-charge gate line;

an amplification transistor in which one of a source electrode and a drain electrode is electrically connected to an other one of the source and drain electrodes of the pre-charge transistor, and a gate electrode is electrically connected to the detection electrode;

a readout transistor in which one of a source electrode and a drain electrode is electrically connected to an other one of the source and drain electrodes of the amplification transistor, and an other one of the source and drain electrodes is electrically connected to the readout line, and a gate electrode is electrically connected to the readout gate line;

a compensation transistor in which one of a source electrode and a drain electrode is electrically connected to said other one of the source and drain electrodes of the amplification transistor, and an other one of the source and drain electrodes is electrically connected to the detection electrode, and a gate electrode is electrically connected to the pre-charge gate line; and a power-source switching transistor in which one of a source electrode and a drain electrode is electrically connected to said one of the source and drain electrodes of the amplification transistor, and an other one of the source and drain electrodes is electrically connected to the coupling pulse line, and a gate electrode is electrically connected to the readout gate line.

Hereinafter, a display device according to an embodiment of the present invention and a driving method of the display device will be described with reference to the accompanying drawings. An image-reading device is explained as a sensor circuit.

Figure 1:
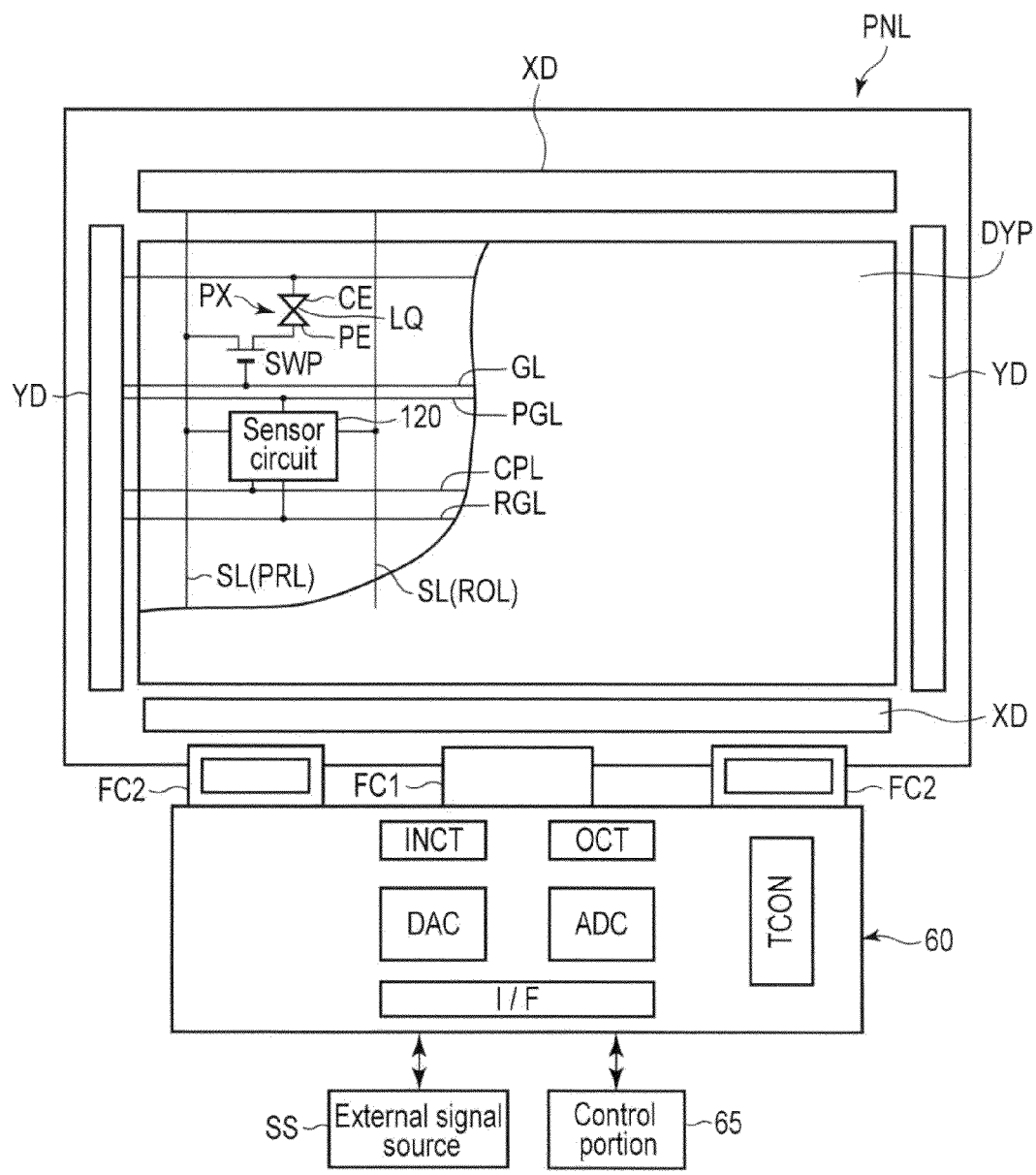
FIG. 1 is a plan view of an exemplary outline showing a structure of a display device of an embodiment.

FIG. 1 is a plan view of an exemplary outline showing a structure of the display device of an embodiment.

A display device 1 of the embodiment comprises a liquid crystal display panel PNL and a circuit board 60. An end of each of flexible substrates FC1 and FC2 is electrically connected to an end portion of the liquid crystal display panel PNL. To the other end of each of the flexible substrates FC1 and FC2, the circuit board 60 is electrically connected.

The liquid crystal display panel PNL comprises a display portion DYP composed of a plurality of pixels arranged at a matrix state, a scanning line driving circuit YD and a signal line driving circuit XD. The scanning line driving circuit YD and the signal line driving circuit XD are allocated around the display portion DYP. The circuit board 60 controls the display operation of the display device, and also controls a sensor circuit 120 provided in the liquid crystal display panel PNL. The circuit board 60 outputs a video signal obtained from an external signal source SS to the liquid crystal display panel PNL. The circuit board 60 supplies a signal which causes the sensor circuit to operate, and outputs the output signal obtained from the sensor circuit to a control portion 65.

FIG. 2 is an exemplary diagram showing a cross-sectional view of the display device of the embodiment.

The display device 1 of the embodiment comprises the liquid display panel PNL, a lighting unit, a frame 40, a bezel cover 50, the circuit board 60 and a protection glass PGL.

The lighting unit is allocated on the back surface side of the liquid crystal display panel PNL. The frame 40 supports the liquid crystal display panel PNL and the lighting unit. The bezel cover 50 is attached to the frame 40 so as to expose the display portion DYP of the liquid crystal display panel PNL. The circuit board 60 is placed on the back surface side of the frame 40. The protection glass PGL is fixed on the bezel cover 50 by an adhesive agent 70.

The liquid crystal display panel PNL comprises an array substrate 10, a counter substrate 20 provided so as to face the array substrate 10, and a liquid crystal layer LQ held between the array substrate 10 and the counter substrate 20. The array substrate 10 comprises a polarizer 10A attached to the principal surface which is on the side opposite to the liquid crystal layer LQ. The counter substrate 20 comprises a polarizer 20A attached to the principal surface which is on the side opposite to the liquid crystal layer LQ.

The lighting unit comprises a light source which is not shown in the figure, a light guiding material 32, a prism sheet 34, a diffusion sheet 36 and a reflection sheet 38.

The light guiding material 32 emits incident light coming from the light source toward the liquid crystal display panel PNL side. The prism sheet 34 and the diffusion sheet 36 are optical sheets located between the liquid crystal display panel PNL and the light guiding material 32. The reflection sheet 38 is provided so as to face the principal surface of the light guiding material 32. The principal surface is on the side opposite to the liquid crystal display panel PNL. The prism sheet 34 and the diffusion sheet 36 collect and diffuse light emitted from the light guiding material 32.

The protection glass PGL protects the display portion DYP of the liquid crystal display panel PNL from the impact from the outside. The protection glass PGL may be omitted.

Next, the display device shown in FIG. 1 is explained in detail.

The liquid crystal display panel PNL has a structure holding the liquid crystal layer LQ between the array substrate 10 and the counter substrate 20 which are a pair of electrode substrates. The transmission rate of the liquid crystal display panel PNL is controlled by the liquid crystal driving voltage applied to the liquid crystal layer LQ from a pixel electrode PE provided on the array substrate 10 and a common electrode CE provided on the counter substrate 20.

With respect to the array substrate 10, a plurality of pixel electrodes PE are allocated substantially at a matrix state on a transparent insulating substrate which is not shown in the figure. A plurality of gate lines GL are arranged along the rows of a plurality of pixel electrodes PE. A plurality of signal lines SL are allocated along the columns of a plurality of pixel electrodes PE.

Each of the pixel electrodes PE and the common electrode CE is formed from a transparent electrode material such as indium tin oxide (ITO), and is covered by an alignment film. The pixel electrode PE and the common electrode CE compose a liquid crystal pixel PX together with a pixel area which is a part of the liquid crystal layer LQ.

In proximity to the intersection positions of the gate lines LG and the signal lines SL, a plurality of pixel switches SWP are placed. Each of the pixel switches SWP is, for example, a thin-film transistor (TFT). A gate of the pixel switch SWP is connected to a gate line GL, and a source-drain path is connected between a signal line SL and a pixel electrode PE. When the pixel switch SWP is driven through the corresponding gate line GL, the pixel switch SWP is conducted between the corresponding signal line SL and the corresponding pixel electrode PE.

The sensor circuit 120 is provided on the array substrate 10. Further, a coupling pulse line CPL, a pre-charge gate line PGL, and a readout gate line RGL are allocated for driving the sensor circuit 120 along the rows of a plurality of pixel electrodes PE.

In this embodiment, the signal line SL is also used as a pre-charge line PRL and a readout line ROL. These lines supply a signal which drives the sensor circuit 120.

The scanning line driving circuit YD supplies a gate voltage for turning the pixel switch SWP on (for causing the source-drain path to be conductive) to a plurality of gate lines GL, and drives the gate lines GL in series. The scanning line driving circuit YD drives a plurality of coupling pulse lines CPL, a plurality of pre-charge gate lines PGL and a plurality of readout gate lines RGL at predetermined timings, and drives the sensor circuit 120.

The signal line driving circuit XD supplies a video signal to the pixel electrode PE via the pixel switch SWP in which the source-drain path is conductive. The video signal is supplied from the signal line SL to the pixel electrode PE.

The circuit board 60 comprises an output circuit portion OCT, an input circuit portion ICNT, a D/A conversion portion DAC, an A/D conversion portion ADC, an interface portion I/F, and a timing controller TCON.

The timing controller TCON controls the operation of each portion mounted on the circuit board 60, and the operations of the scanning line driving circuit YD, the signal line driving circuit XD and the sensor circuit 120.

The digital video signal taken in from the external signal source SS through the interface portion I/F is converted into an analog signal by the D/A conversion portion DAC, and is output to the signal line SL by the input circuit portion ICNT at a predetermined timing.

The output signal from the sensor circuit 120 is supplied to the A/D conversion portion ADC at a predetermined timing by the output circuit portion OCT, converted into a digital signal, and supplied to the interface portion I/F. The interface portion I/F outputs the received digital signal to the control portion 65. The control portion 65 conducts a coordinate calculation based on the received digital signal, and detects the coordinate position of the contact of a fingertip or a stylus point, etc.

Figure 3:
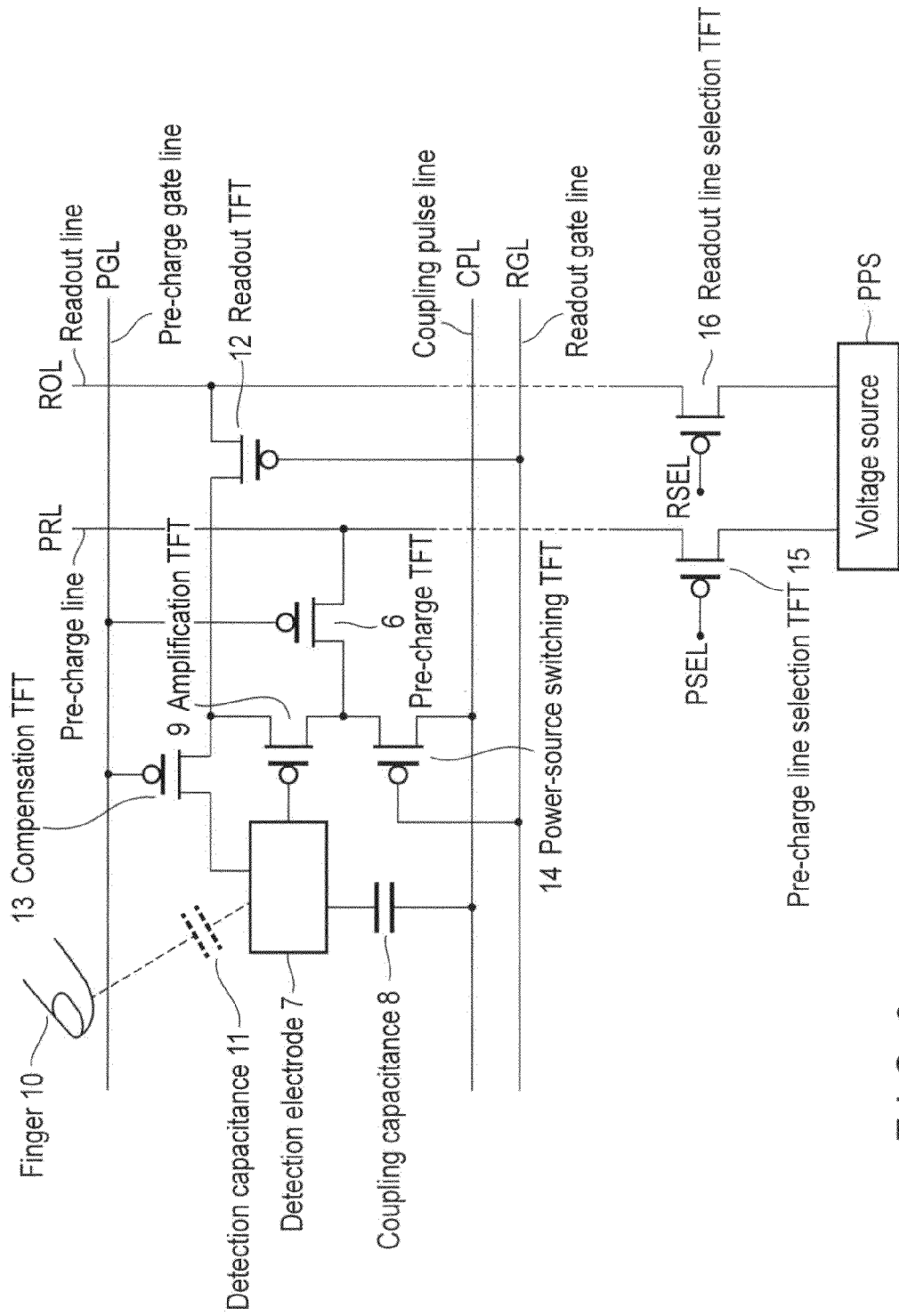
FIG. 3 is an exemplary diagram showing an equivalent circuit of a sensor circuit of the embodiment.

FIG. 3 is an exemplary diagram showing an equivalent circuit of the sensor circuit 120 in the embodiment.

The sensor circuit 120 comprises a detection electrode 7, the pre-charge line PRL, the readout line ROL, the pre-charge gate line PGL, the coupling pulse line CPL, the readout gate line RGL, coupling capacitance 8, a pre-charge TFT 6, an amplification TFT 9, a readout TFT 12, a compensation TFT 13, and a power-source switching TFT 14. Outside the sensor circuit 120, a pre-charge line selection TFT 15 is connected to the pre-charge line PRL, and a readout line selection TFT 16 is connected to the readout line ROL.

The detection electrode 7 detects the change in detection capacitance due to presence or absence of a contact material (dielectric material). The pre-charge line PRL supplies a pre-charge voltage to the detection electrode 7. The readout line ROL extracts the voltage of the detection electrode 7. The pre-charge gate line PGL, the coupling pulse line CPL and the readout gate line RGL supply a signal for driving the operation of the sensor circuit 120.

The pre-charge TFT 6 is a switch for writing a pre-charge voltage into the detection electrode 7 and retaining the voltage. The coupling capacitance 8 causes the detection electrode 7 to generate a voltage difference due to the change in detection capacitance. The amplification TFT 9 is a switch for amplifying the voltage generated in the detection electrode 7. The readout TFT 12 is a switch for outputting the amplified voltage to the readout line ROL and retaining the voltage. The compensation TFT 13 is a switch which connects and disconnects the path for supplying a pre-charge voltage to the detection electrode 7. The power-source switching TFT 14 is a switch which connects and disconnects the path for supplying the signal from the coupling pulse line CPL to the amplification TFT 9.

The pre-charge line PRL and the readout line ROL use the common line to the signal line SL. As one sensor circuit 120 is provided for a plurality of pixels PXs, a part of the signal line SL is shared.

The pre-charge TFT 6 is, for example, a p-type thin-film transistor. The gate electrode of the pre-charge TFT 6 is electrically connected to (or integrally constructed with) the pre-charge gate line PGL. The source electrode of the pre-charge TFT 6 is electrically connected to (or integrally constructed with) the pre-charge line PRL. The drain electrode of the pre-charge TFT 6 is electrically connected to (or integrally constructed with) the source electrode of the amplification TFT 9.

The amplification TFT 9 is, for example, a p-type thin-film transistor. The gate electrode of the amplification TFT 9 is electrically connected to (or integrally constructed with) the detection electrode 7. The source electrode of the amplification TFT 9 is electrically connected to (or integrally constructed with) the drain electrode of the power-source switching TFT 14. The drain electrode of the amplification TFT 9 is electrically connected to (or integrally constructed with) the source electrode of the readout TFT 12.

The readout TFT 12 is, for example, a p-type thin-film transistor. The gate electrode of the readout TFT 12 is electrically connected to (or integrally constructed with) the readout gate line RGL. The source electrode of the readout TFT 12 is electrically connected to (or integrally constructed with) the drain electrode of the amplification TFT 9. The drain electrode of the readout TFT 12 is electrically connected to (or integrally constructed with) the readout line ROL.

The compensation TFT 13 is, for example, a p-type thin-film transistor. The gate electrode of the compensation TFT 13 is electrically connected to (or integrally constructed with) the pre-charge gate line PGL. The source electrode of the compensation TFT 13 is electrically connected to (or integrally constructed with) the drain electrode of the amplification TFT 9. The drain electrode of the compensation TFT 13 is electrically connected to (or integrally constructed with) the detection electrode 7.

The power-source switching TFT 14 is, for example, a p-type thin-film transistor. The gate electrode of the power-source switching TFT 14 is electrically connected to (or integrally constructed with) the readout gate line RGL. The source electrode of the power-source switching TFT 14 is electrically connected to (or integrally constructed with) the coupling pulse line CPL. The drain electrode of the power-source switching TFT 14 is electrically connected to (or integrally constructed with) the source electrode of the amplification TFT 9.

The pre-charge line selection TFT 15 is, for example, a p-type thin-film transistor. The gate electrode of the pre-charge line selection TFT 15 is electrically connected to (or integrally constructed with) a pre-charge selection line PSEL. The source electrode of the pre-charge line selection TFT 15 is electrically connected to (or integrally constructed with) a voltage source PPS. The drain electrode of the pre-charge line selection TFT 15 is electrically connected to (or integrally constructed with) the pre-charge line PRL.

The readout line selection TFT 16 is, for example, a p-type thin-film transistor. The gate electrode of the readout line selection TFT 16 is electrically connected to (or integrally constructed with) a readout selection line RSEL. The source electrode of the readout line selection TFT 16 is electrically connected to (or integrally constructed with) the voltage source PPS. The drain electrode of the readout line selection TFT 16 is electrically connected to (or integrally constructed with) the readout line ROL.

FIG. 4 is an exemplary timing chart for explaining an example of a driving method of the display device 1 of the embodiment.

As shown in the voltage source wave form of FIG. 4, from the voltage source PPS, firstly, an initialized voltage is supplied, and next a pre-charge voltage is supplied. The initialized voltage is lower than the pre-charge voltage. For example, the initialized voltage is around zero relative to a display voltage (for example, 0 to 10 V).

The initialized voltage is supplied from the voltage source PPS. At this state, a pre-charge gate signal PG which is a driving signal is output to the pre-charge gate line PGL. A readout gate signal RG which is a driving signal is output to the readout gate line RGL. A pre-charge line selection signal PSE which is a driving signal is output to the pre-charge selection line PSEL. A readout line selection signal RSE which is a driving signal is output to the readout selection line RSEL.

[Operation at Timing T1: Initialization Operation]

When the pre-charge line selection signal PSE and the readout line selection signal RSE are at on-level (low level), each of the pre-charge line selection TFT 15 and the readout line selection TFT 16 is turned on, and an initialized voltage is applied to each of the pre-charge line PRL and the readout line ROL from the voltage source PPS.

When the readout gate signal RG is at on-level (low level), the readout TFT 12 connected to the readout gate line RGL is turned on. When the pre-charge gate signal PG is at on-level (low level), the compensation TFT 13 and the pre-charge TFT 6 which are connected to the pre-charge gate line PGL are turned on.

As a result, the initialized voltage applied to the readout line ROL is applied to the detection electrode 7 through the readout TFT 12 and the compensation TFT 13. As described above, the initialized voltage is around zero, and the level of the initialized voltage is lower than the normal pre-charge voltage. Therefore, the potential of the detection electrode 7 is low, and the amplification TFT 9 is turned on. As a result, the initialized voltage applied to the pre-charge line PRL is applied to the detection electrode 7 through the pre-charge TFT 6 and the amplification TFT 9.

Thus, by retaining the readout line ROL, the pre-charge line PRL and the detection electrode 7 at low voltage, it is possible to remove (initialize) the influence of the potential remaining in the signal lines and the detection electrode in the display period.

[Operation at Timing T2: Threshold Voltage Compensation Operation]

The readout gate signal RG and the readout line selection signal RSE are at off-level (high level). Thus, the supply of the initialized voltage via the readout line ROL is stopped. The supply of the initialized voltage via the pre-charge line PRL is continued.

At this state, as the compensation TFT 13 is turned on, the gate and the drain of the amplification TFT 9 are electrically connected. Therefore, a threshold voltage Vth of the amplification TFT 9 is added to the detection electrode 7. In other words, a voltage which compensates for variability of threshold voltages is applied to the detection electrode 7. Thus, the voltage of the gate electrode of the amplification TFT 9 reflects the variability of threshold voltages of the amplification TFT 9.

[Operation at Timing T3]

The potential of a coupling pulse signal CP supplied to the coupling pulse line CPL is set to be low. This coupling pulse signal CP is added to an end of the coupling capacitance 8. As a result, the potential of the detection electrode 7 is decreased. Thus, it is possible to enlarge the change in potential of the detection electrode 7 due to presence or absence of a contact material. This change is explained later.

[Operation at Timing T4: Pre-charge Operation]

The voltage supplied from the voltage source PPS is changed from the initialized voltage to the pre-charge voltage. The pre-charge voltage is applied to the detection electrode 7 via the pre-charge line PRL, the pre-charge TFT 6, the amplification TFT 9 and the compensation TFT 13. As a result, the potential of the detection electrode 7 increases compared with the time when the initialized voltage is applied. As described above, the voltage of the detection electrode 7 is applied, and thus, the voltage of the gate electrode of the amplification TFT 9 compensates for variability of threshold voltages of the amplifier TFT 9.

[Operation at Timing T5]

The pre-charge gate signal PG and the pre-charge line selection signal PSE are at off-level (high level). As a result, the detection electrode 7 is at a floating state. The potential of the detection electrode 7 via detection capacitance 11 is changed relying on presence or absence of a contact material (finger 10).

[Operation at Timing T6]

The potential of the coupling pulse signal CP supplied to the coupling pulse line CPL is set to be high. This coupling pulse signal CP is added to an end of the coupling capacitance 8. As a result, the potential of the detection electrode 7 is increased. As shown in the detection electrode voltage of FIG. 4, it is possible to generate a voltage difference between the detection electrode potential (finger absent) and the detection electrode potential (finger present).

[Operation at Timing T7]

At timing T7, the readout gate signal RG supplied to the readout gate line RGL is at on-level (low level). The power-source switching TFT 14 is turned on. The coupling pulse signal CP supplied to the coupling pulse line CPL is input to the source electrode of the amplification TFT 9 via the power-switching TFT 14. As explained above, the operation point (amplification degree) of the amplification TFT 9 changes depending on the voltage of the detection electrode 7. Therefore, an amplified voltage indicating presence or absence of a contact material (finger 10) is output from the drain electrode of the amplification TFT 9.

When the readout gate signal RG is at on-level (low level), the readout TFT 12 becomes conductive, and the detection signal from the amplification TFT 9 is output to the readout line ROL via the readout TFT 12. The wave form of the voltage output to the readout line ROL in FIG. 4 shows this voltage change. Between the output voltage (finger present) and the output voltage (finger absent), a voltage difference is created.

By detecting the output voltage difference between the output voltage (finger present) and the output voltage (finger absent) when an output period passed after the readout gate line PGL was turned on (for example, at timing T8), it is possible to detect the contact position of a fingertip or a stylus point, etc.

In the initialization operation at timing T1, when the power-source switching TFT 14 is turned on, the initialized voltage and the high voltage of the coupling pulse signal CP are both input on the drain electrode side of the power-source switching TFT 14 (the drain electrode side of the pre-charge TFT 6). Therefore, although the voltage of the detection electrode 7 is higher than the initialized voltage, the amplification TFT 9 can be turned on by selecting the characteristics of the amplification TFT 9.

According to the reading device of the embodiment explained above, the following effects can be obtained.

In the embodiment, the drain electrode of the amplification TFT 9 is connected to the detection electrode 7 via the compensation TFT 13 in the pre-charge period. By this structure, offset of only the threshold voltage of the amplification TFT 9 is possible at the time of writing the pre-charge voltage. Therefore, the optimal operation point of the amplification TFT 9 does not receive the influence from variability of threshold voltages. As a result, a high reading performance can be realized.

In the driving method of the traditional image-reading device, a pre-charge voltage is applied immediately after the sensor operation period started. However, the driving method of the image-reading device of the embodiment described herein is different in the following respect. In the embodiment, an initialized voltage is applied to the detection electrode 7 via the readout line ROL before a pre-charge voltage is applied to the detection electrode 7 via the pre-charge TFT 6. By driving the image-reading device in this manner, the influence of a display signal can be removed, and the voltage of the detection electrode 7 can be set to be low before the pre-charge voltage is applied. Therefore, it is possible to more easily apply the pre-charge voltage.

A pre-charge voltage can be further easily applied by applying an initialized voltage to the detection electrode 7 via the readout line ROL before the pre-charge voltage is applied to the detection electrode 7 via the pre-charge TFT 6, and simultaneously applying the initialized voltage to the pre-charge line PRL as well.

Figure 5:
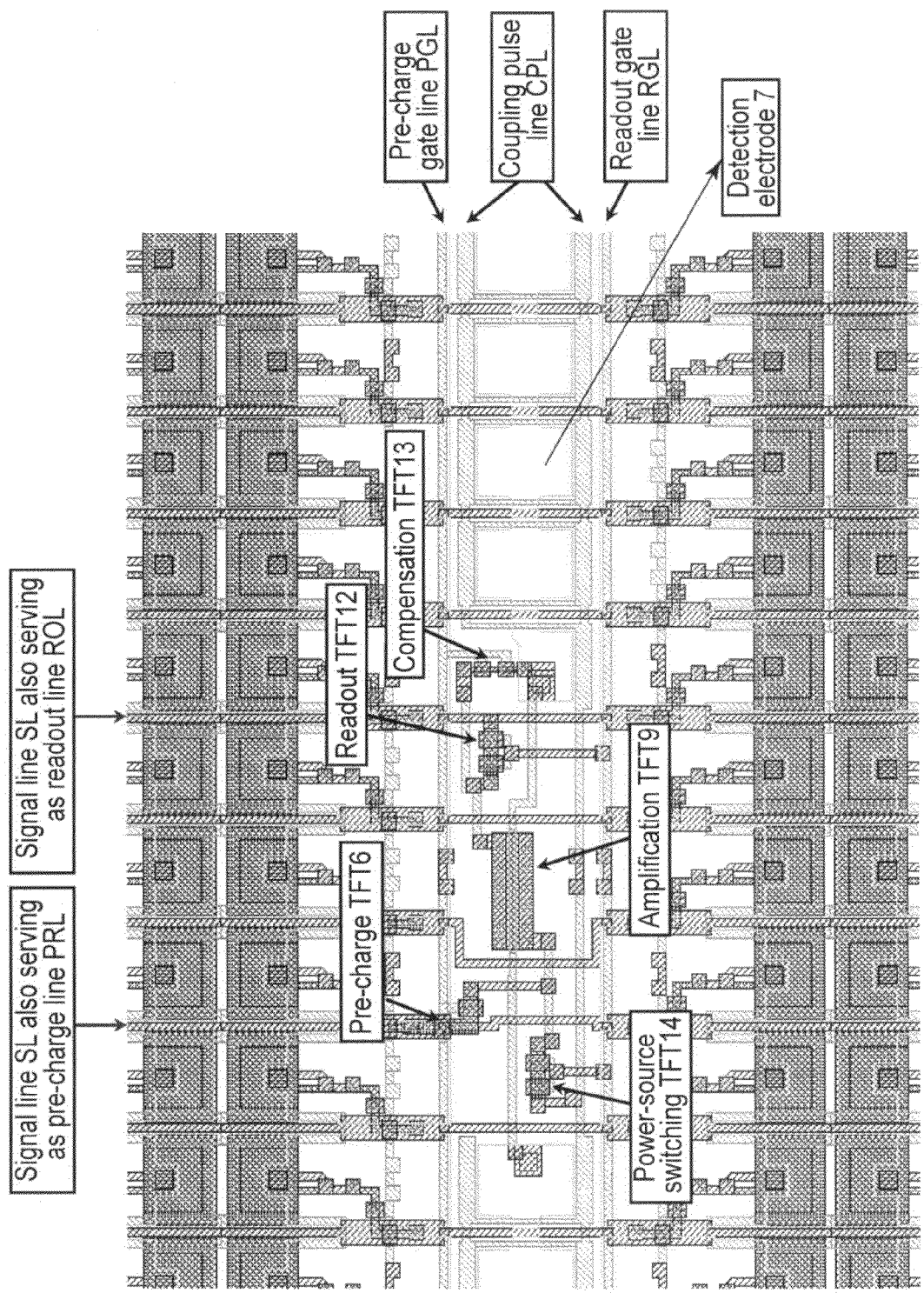
FIG. 5 is an exemplary diagram showing a pixel layout in the display device of the embodiment.

FIG. 5 is an exemplary diagram showing a pixel layout in the display device of the embodiment. As illustrated in FIG. 5, in every pair of adjacent two pixel rows, a pixel PX of each row is allocated so as to face each other. A required space is provided between the two pixel rows. In the space, the sensor circuit 120 including the detection electrode 7 is formed.

A detection electrode 7 is provided in a zone ranging over a plurality of pixels PXs along the row axis. The pre-charge gate line PGL, the coupling pulse line CPL and the readout gate line RGL are allocated along the row axis. The signal line SL (which serves as the pre-charge line PRL and the readout line ROL) is provided along the column axis of pixels PXs. Each signal line SL is connected to the pre-charge TFT 6 and the readout TFT 12. Thus, a detection electrode 7 is provided in a zone ranging over a plurality of pixels PXs along the row axis. This structure is provided in order to detect the capacitance change relative to a contact material (dielectric material) with a good sensitivity.

FIG. 6 is an exemplary diagram for explaining a driving method of the display and the sensor of the display device of the embodiment. In this display device, a sensor row is provided for sixteen pixel rows. Hereinafter, sensor rows and display rows are distinguished as the first row, second row, . . . from the upper portion to the lower portion of the screen.

In a basic driving method, firstly, the sensor detection signal of the first row is read. After that, a display signal is output to the first to sixteenth display rows. Next, the sensor detection signal of the second row is read, and then a display signal is output to the seventeenth to thirty second display rows. In this manner, a sensor detection signal is read and an image is displayed repeatedly.

In a double driving method, firstly, the sensor detection signal of the first row is read twice, and then a display signal is output to the first to sixteenth display rows. Next, the sensor detection signal of the second row is read twice, and then a display signal is output to the seventeenth to thirty second display rows. In this manner, a sensor detection signal is read twice and an image is displayed repeatedly.

By executing the above initialization operation at the time of sensor detection operation, it is possible to remove the influence of the display pattern in the driving methods shown in FIG. 6.

[Variation of Embodiment]

The above embodiment can be structured with variations.
(1) In the above embodiment, each TFT is structured by using a p-type thin-film transistor. However, each TFT can be structured by using an n-type thin-film transistor.
(2) In the above embodiment, a touchscreen comprising an active sensor circuit is explained. However, the active sensor circuit is not limited to the structure described above. Further, a touchscreen comprising a passive sensor circuit can be also applied.
(3) The display device 1 of the above embodiment may be a liquid crystal display device which adopts a display mode such as a twisted nematic (TN) mode, an IPS mode and an optically compensated bend (OCB) mode.
(4) The display device of the above embodiment may be applied to a color display device and a black-and-white display device.
(5) A coupling pulse may not be supplied from the gate line GL. For example, a line which is parallel to the signal line SL may be added so as to be a coupling pulse line.
(6) The timing controller TCON is not limited to the embodiment provided in the circuit board 60. The timing controller TCON may be provided outside, or may be provided on the TFT substrate.
(7) The amplification TFT 9 is not limited to the embodiment, and may be structured by using an amplifier.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
a display pixel allocated at a matrix state in a display area;
an image-reading device which detects strength of capacitive coupling by a dielectric material coming close to or making contact with the display area; and
a control portion which controls each transistor of the image-reading device, wherein
the image-reading device comprises:
a pre-charge gate line, a coupling pulse line and a readout gate line, these lines supplying a signal driving the image-reading device;
a detection electrode which forms capacitance between the detection electrode and the dielectric material;
a pre-charge line which applies a voltage to the detection electrode;
a readout line which reads a detection signal from the detection electrode;
a pre-charge transistor in which one of a source electrode and a drain electrode is electrically connected to the pre-charge line, and a gate electrode is electrically connected to the pre-charge gate line;
an amplification transistor in which one of a source electrode and a drain electrode is electrically connected to an other one of the source and drain electrodes of the pre-charge transistor, and a gate electrode is electrically connected to the detection electrode;
a readout transistor in which one of a source electrode and a drain electrode is electrically connected to an other one of the source and drain electrodes of the amplification transistor, and an other one of the source and drain electrodes is electrically connected to the readout line, and a gate electrode is electrically connected to the readout gate line;
a compensation transistor in which one of a source electrode and a drain electrode is electrically connected to said other one of the source and drain electrodes of the amplification transistor, and an other one of the source and drain electrodes is electrically connected to the detection electrode, and a gate electrode is electrically connected to the pre-charge gate line; and a power-source switching transistor in which one of a source electrode and a drain electrode is electrically connected to said one of the source and drain electrodes of the amplification transistor, and an other one of the source and drain electrodes is electrically connected to the coupling pulse line, and a gate electrode is electrically connected to the readout gate line.

2. The display device according to claim 1, wherein the control portion controls the image-reading device in a manner that the image-reading device comprises an initialization period in which an initialized voltage is applied to the detection electrode, a threshold compensation period in which a threshold voltage of the amplification transistor is obtained, a pre-charge period in which a pre-charge voltage higher than the initialized voltage is applied, and a readout period in which a voltage generated in the detection electrode by presence or absence of access or contact between the dielectric material and the detection electrode is read through the readout line, and in the initialization period, the control portion applies the initialized voltage to the readout line and the pre-charge line, and controls the pre-charge transistor, the readout transistor, the compensation transistor and the power-source switching transistor so as to be conductive.

3. The display device according to claim 1, wherein the readout line and the pre-charge line are shared with a signal line which supplies a video signal to the display pixel.

4. The display device according to claim 2, wherein the initialized voltage is substantially zero.

5. The display device according to claim 2, wherein the control portion controls the readout transistor and the power-source switching transistor in a manner that the readout transistor and the power-source switching transistor are made nonconductive in the threshold compensation period after the initialization period.

6. The display device according to claim 2, wherein the control portion is configured to apply the pre-charge voltage to the pre-charge line in the pre-charge period after the threshold compensation period.

7. The display device according to claim 2, wherein the control portion controls the precharge transistor, the compensation transistor, the power-source switching transistor and the readout transistor in a manner that, in the readout period after the pre-charge period, each of the pre-charge transistor and the compensation transistor is made nonconductive and each of the power-source switching transistor and the readout transistor is made conductive.

* * * * *